(12) United States Patent
Groth

(10) Patent No.: US 7,338,626 B1
(45) Date of Patent: Mar. 4, 2008

(54) HIGH CAVITATION, LOW TONNAGE RUBBER MOLD MACHINE AND METHOD

(75) Inventor: Gary L. Groth, Manning, SC (US)

(73) Assignee: Federal Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/538,953

(22) Filed: Oct. 5, 2006

(51) Int. Cl.
*B29C 45/53* (2006.01)
*B29C 45/64* (2006.01)

(52) U.S. Cl. ............................. 264/297.2; 264/328.1; 425/190; 425/451.7; 425/588; 425/595

(58) Field of Classification Search ............... 425/190, 425/338, 543, 588, 595, 451.7; 264/297.2, 264/328.1, 328.8, 334
See application file for complete search history.

(56) References Cited

U.S. PATENT DOCUMENTS

| | | | | |
|---|---|---|---|---|
| 2,001,305 | A | * | 5/1935 | Gorham et al. ............. 425/338 |
| 3,357,058 | A | * | 12/1967 | Kutik ......................... 425/588 |
| 3,663,145 | A | | 5/1972 | Teraoka |
| 4,025,268 | A | | 5/1977 | Taylor |
| 4,158,910 | A | | 6/1979 | Hanas et al. |
| 4,202,522 | A | | 5/1980 | Hanas et al. |
| 4,496,304 | A | | 1/1985 | Bouwhuis |
| 4,706,924 | A | * | 11/1987 | de Larosiere ............... 425/190 |
| 4,861,254 | A | | 8/1989 | Takeuchi et al. |
| 5,783,224 | A | | 7/1998 | Heinlen et al. |
| 6,155,811 | A | | 12/2000 | Looije et al. |
| 6,343,926 | B1 | | 2/2002 | Lin |
| 6,413,074 | B1 | | 7/2002 | Hays |
| 6,779,999 | B2 | | 8/2004 | Ciccone |
| 6,840,753 | B2 | | 1/2005 | Bachan |
| 6,875,393 | B2 | * | 4/2005 | Persson ................... 264/328.1 |
| 2004/0076701 | A1 | | 4/2004 | Lai |
| 2004/0241266 | A1 | | 12/2004 | Neubauer et al. |

* cited by examiner

*Primary Examiner*—James R Mackey
(74) *Attorney, Agent, or Firm*—Robert L. Stearns; Dickinson Wright PLLC

(57) ABSTRACT

A rubber injection molding apparatus and method for simultaneously molding a plurality of work parts (40) in separate molds (30) using a single, vertically oriented press machine (22). A clamping mechanism (52) is responsive to the vertical, reciprocating motion of the press ram (26) for converting the generally vertical motion of the press ram (26) into a horizontal clamping force to squeeze and hold the molds while rubber is injected into their cavities (38). The molds (30) each have two mold halves (32, 34) joining one another along a parting line interface (36) with the mold cavity (38) in between. The mold halves (32, 34) are received in universal carriers (62), which in turn are suspended between and slideable along spaced-apart first (58) and second (60) rails. A large number of mold cavities (38) can be filled simultaneously using a vertically oriented press machine (22). The plurality of molds (30) may contain different part configurations which are filled simultaneously in a single molting operation. Because the molds (30) are not fastened to platens as in prior art vertical press machines, changeover times are substantially decreased.

17 Claims, 5 Drawing Sheets

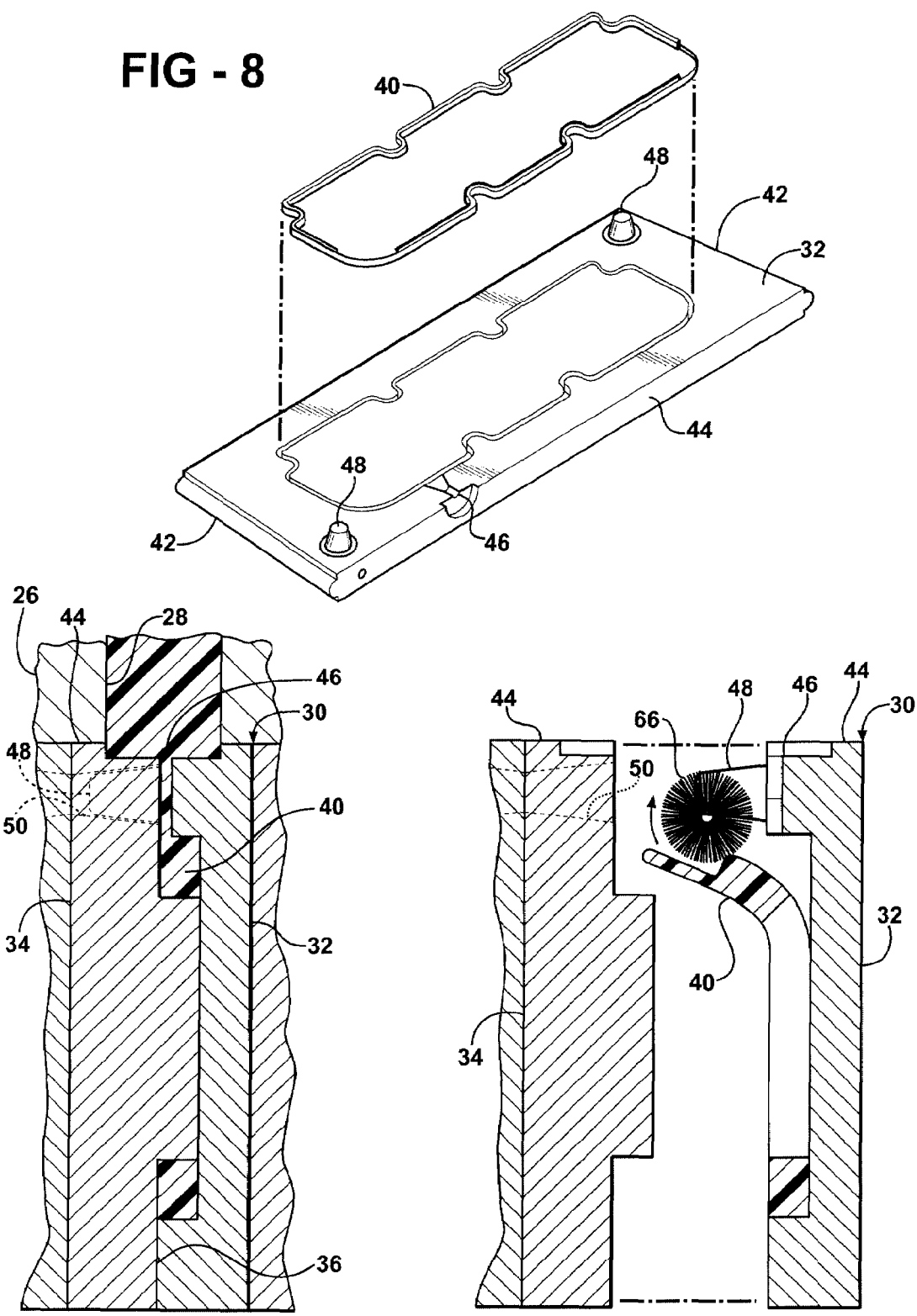

HIGH CAVITATION, LOW TONNAGE RUBBER MOLD MACHINE AND METHOD

CROSS REFERENCE TO RELATED APPLICATIONS

None.

BACKGROUND OF THE INVENTION

1. Field of the Invention

A rubber injection molding apparatus and method for simultaneously molding a plurality of work parts in separate horizontally arrayed molds using a single, vertically oriented press machine.

2. Related Art

One of the most common methods of shaping rubber resin into a work part is a process called injection molding. Injection molding is accomplished by an injection molding machine which, typically, is a large industrial piece of capital equipment. According to the injection molding process, rubber resin is fed into a hopper, where colorants or other properties may be introduced. A barrel or other device receives the resins and elevates their temperature to an appropriate melting point. Once molten, the resin is injected into a mold cavity.

Because of the extreme pressures developed during the injection process, the mold halves must be held firmly against one another in a high tonnage press machine. Such press machines as used in the injection molding art are, more often than not, arranged in a horizontal motion configuration, whereby the press ram and/or the press bed move in a reciprocating, generally horizontal path toward and away from one another. Such a configuration orients the parting line interface of the mold cavity in a generally vertical orientation, so that as the mold halves open to remove a finished, molded work part from the mold cavity. The molded part can be swept out and allowed to fall into a collection bin below.

Many manufacturing facilities include press machines having vertically oriented reciprocating elements. In other words, a typical vertical press may be used for stamping, compression molding or other general fabrication applications and include a vertically oriented press ram supported for reciprocating movement in a generally vertical path toward and away from a press bed. Such press machines represent heavy, expensive pieces of fixed equipment which are generally inefficient for use in high-volume rubber injection molding applications.

Accordingly, there is a need to easily convert and enable a typical prior art vertical press for use in high-volume rubber injection molding applications.

Furthermore, there is a need in this field to reduce the amount of time required to change molds. Studies have shown that leading causes of slow mold changes include the millwright using either the wrong tools or the wrong fasteners. Even fast mold changes consume valuable production time when changing molds from one job to the next and whenever the process cannot be readily automated. Accordingly, the time lost during mold changes is a serious issue in the field of injection molding.

SUMMARY OF THE INVENTION

A rubber injection molding apparatus is provided for simultaneously molding a plurality of work parts in separate molds using a single press machine. The apparatus comprises a rubber injection press machine including a press bed and a vertically oriented press ram supported for reciprocating movement in a generally vertical path toward and away from the press bed. A plurality of separate and distinct injection molds are positioned between the press bed and the press ram. Each mold has two mold halves joining one another along a parting line interface with a mold cavity defined in between. A supply of molten rubber communicates with the press ram for injecting into the molds. A clamping mechanism is directly responsive to the vertical motion of the press ram for compressing the plurality of molds in a direction normal to their parting lines. Each of the plurality of separate and distinct injection molds is arranged horizontally relative to one another such that each parting line is disposed generally parallel to the movement of the press ram. According to this configuration, the generally vertical motion of the press ram is converted into a generally horizontal clamping force by the clamping mechanism and thereby simultaneously compresses all of the molds together.

According to a second aspect of the invention, a method is provided for simultaneously molding a plurality of work parts in separate molds using a single press machine. The method comprises the steps of providing a rubber injection press machine having a movable press ram and a press bed, reciprocating the press ram in a generally vertically path toward and away from the press bed, providing a plurality of separate and distinct injection molds each having two mold halves joining one another along a parting line interface with a mold cavity in between, positioning the molds between the press bed and the press ram in a horizontally extending array such that each of the parting lines are disposed generally parallel to the movement of the press ram, supplying molten rubber to the press ram, compressing the plurality of molds together in response to the reciprocating motion of the press ram, and the compressing step further including converting the generally vertical motion of the press ram into a generally horizontal clamping force and thereby simultaneously compressing all of the molds together.

The subject invention overcomes the shortcomings and disadvantages of prior art systems by enabling a vertical type press machine to be converted for use in a rubber injection molding application. The plurality of molds are arranged in a horizontally extending array in the path of the press ram, and are compressed together in the horizontal direction through the clamping mechanism or other appropriate technique to achieve the necessary resistance force to the rubber injection process. Advantages include the ability to inject molten rubber simultaneously into a large number of cavities. The plurality of molds filled simultaneously do not necessarily need to be identical to one another. Further perfecting features of the invention enable rapid mold exchanges and largely unattended automation in the molding process. Due to the increased ability for high product through-put, as well as the ability to convert existing capital equipment to new uses, the subject invention represents a unique and highly desirable advance in the field of rubber injection.

BRIEF DESCRIPTION OF THE DRAWINGS

These and other features and advantages of the present invention will become more readily appreciated when considered in connection with the following detailed description and appended drawings, wherein:

FIG. 8 is an exploded perspective view depicting a molded work part in relation to its associated mold cavity;

FIG. 9 is a simplified cross-sectional view through a mold cavity as in FIG. 5, but showing molten rubber injected through the gate and filling the mold cavity; and FIG. 10 is a view as in FIG. 9 and demonstrating the step of removing the molded part from the mold cavity with the assistance of a sweeping device.

DETAILED DESCRIPTION OF THE PREFERRED EMBODIMENT

Figure 6:
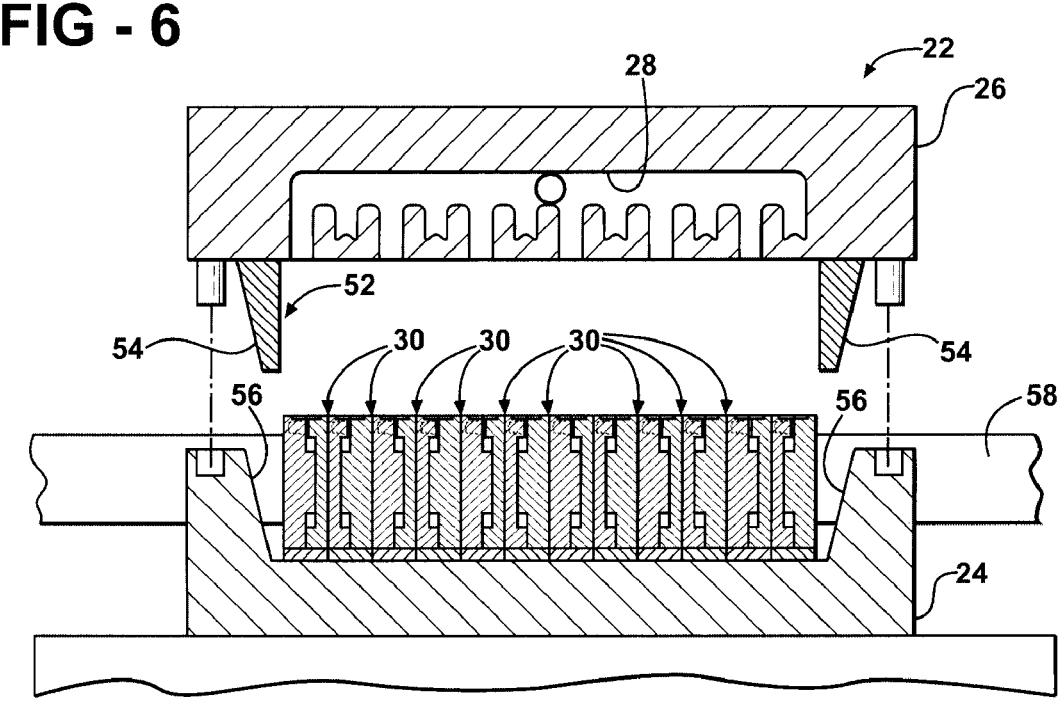
FIG. 6 is a simplified cross-sectional view showing the press ram lifted away from the press bed with the plurality of molds positioned therein.
Figure 7:
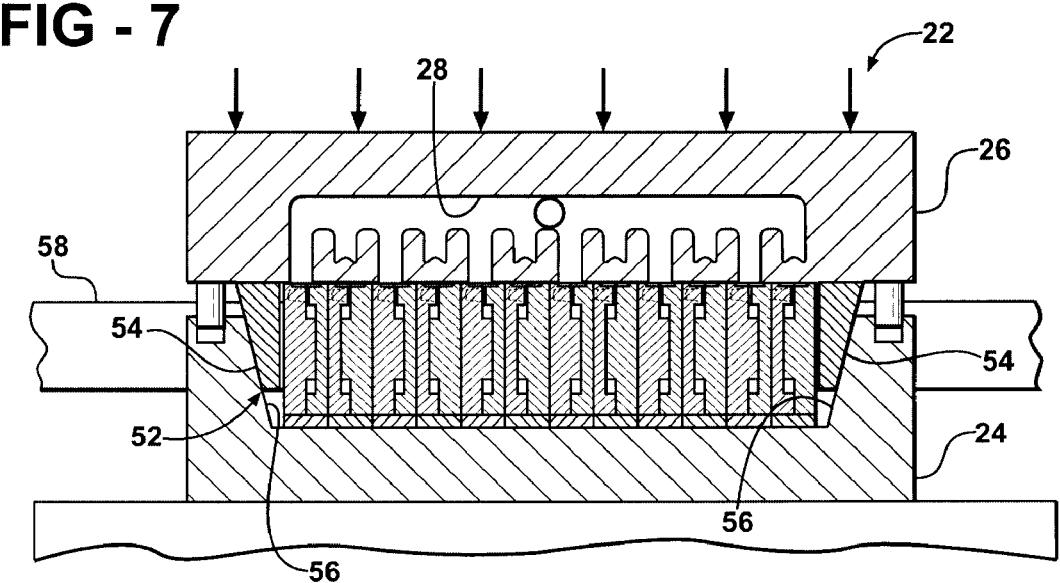
FIG. 7 is a view as in FIG. 6 but showing the press ram in a fully compressed position against the press bed with the molds ready for an injection of molten rubber.

Referring to the Figures, wherein like numerals indicate like or corresponding parts throughout the several views, a rubber injection molding apparatus of the type for simultaneously molding a plurality of work parts in separate molds using a single press machine is generally shown at 20. A rubber injection press machine, generally indicated at 22, includes a press bed 24 and a vertically oriented press ram 26 supported for reciprocating movement in a generally vertical path toward and away from the press bed 24. The press ram 26 may be equipped with heaters, a runner system 28 and nozzles, as suggested in FIGS. 6 and 7, so as to distribute molten rubber to and among the plurality of molds at the appropriate time in the molding cycle.

A plurality of separate and distinct injection molds, generally indicated at 30, are positioned in the press zone, i.e., between the press bed 24 and the press ram 26 or, said another way, within the reciprocating path of the press ram 26. Each mold 30 includes two mold halves 32, 34 adjoining one another along a parting line interface 36. A mold cavity 38 is defined as an open space between each of the mold halves 32, 34. In one embodiment, mold cavities 38 for molding parts that are primarily planar but have a large projected area can be made. Such parts will have small cross sections as taken in a horizontal plane, thereby giving very low projected areas in that perspective and requiring far lower tonnage clamping forces.

FIGS. 2, 3, 5 and 8-10 are particularly illustrative as to the molds 30 in one exemplary embodiment of a work part 40 made in the shape of a head gasket or valve cover gasket for an internal combustion engine. Here, each mold half 32, 34 is shown having a generally trapezoidal shape defined by tapering lateral edges 42 and generally horizontal, planar top edges 44. A gate 46 is formed between each of the mold halves 32, 34 through the top edges 44. The gate 46 leads to the mold cavity 38, as best shown in FIGS. 3-5 and 9.

Figure 1:
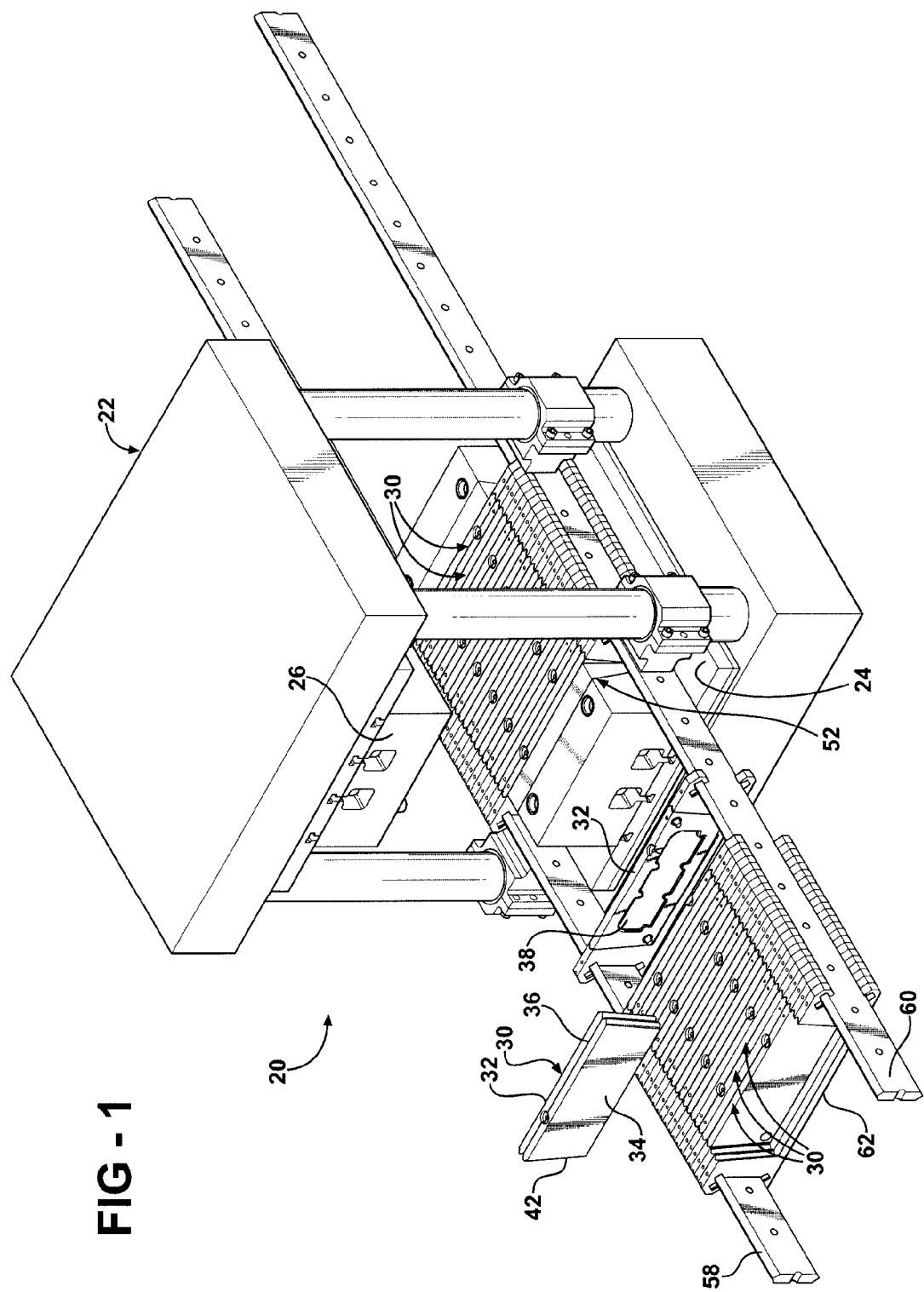
FIG. 1 is a perspective view of a vertically oriented press machine including a plurality of molds arrayed in both the press zone as well as in an adjacent loading/unloading zone.
Figure 2:
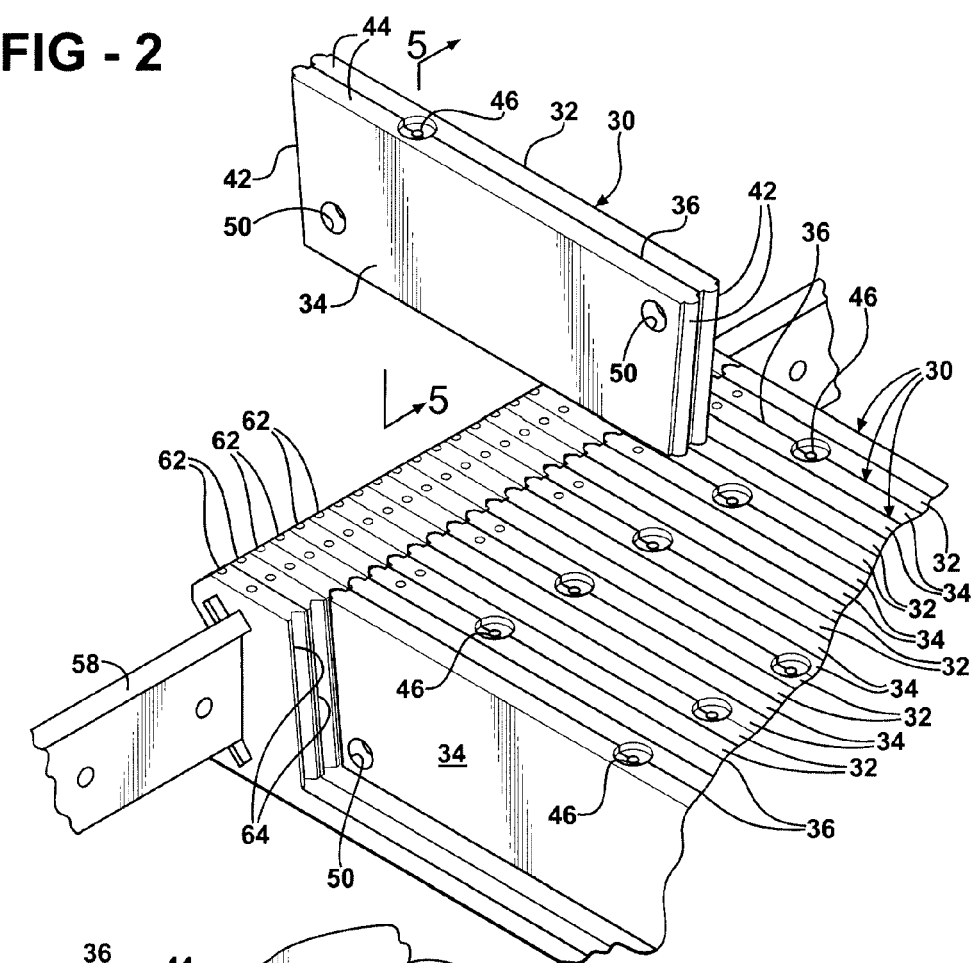
FIG. 2 is a fragmentary perspective view depicting a pair of mating mold halves separated from their respective carriers.

Preferably, the gate 46 is of the well-known edge gate configuration style. However, other gate configuration styles may be used and/or preferred depending upon the application. The gate 46 may be offset toward, or proximate to, one of the lateral edges 42 as shown in FIG. 2. This may be preferred so that the next adjacent mold 30 in the press machine 22 can be rotated 180° and thereby alternate the gates 46 in an advantageously spaced orientation so that the runners 28 and nozzles in the press ram 26 are conveniently dispersed.

Figure 3:
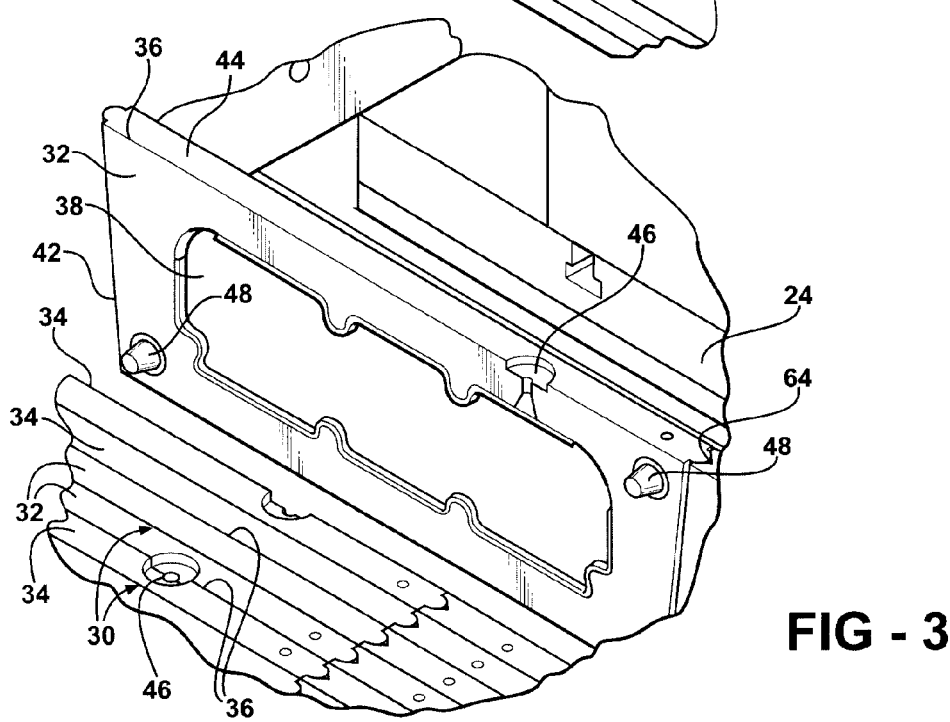
FIG. 3 is a fragmentary perspective view of a mold cavity formed in one mold half according to the invention.
Figure 4:
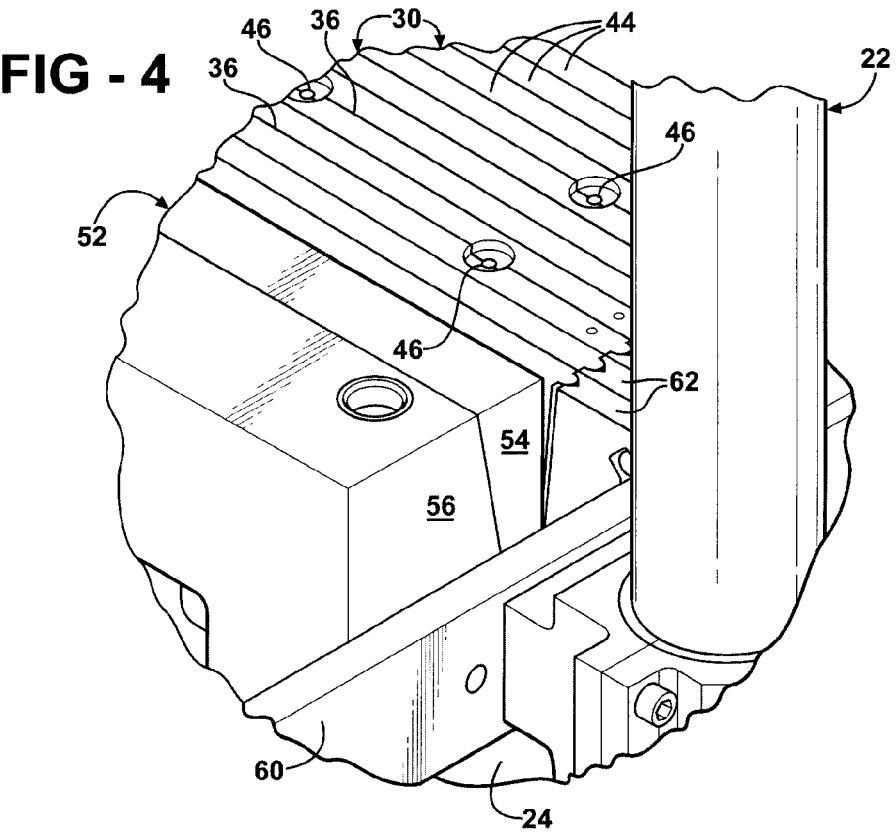
FIG. 4 is a fragmentary perspective view illustrating the clamping mechanism of the subject invention in relation to an array of molds.
Figure 5:
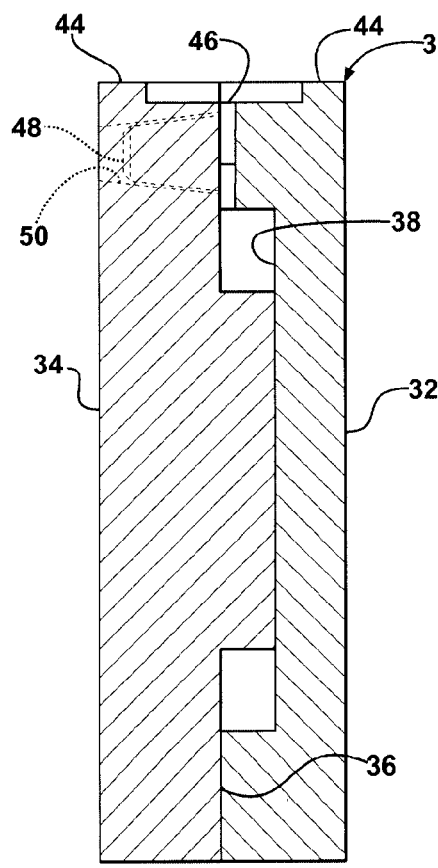
FIG. 5 is a cross-sectional view taken generally along lines 5-5 in FIG. 2, the section line extending through a gate leading to the mold cavity between the two mold halves.

In FIG. 3, a pair of locator pins 48 are shown extending from the mold half 32 for mating in a complementary socket 50 in the opposing mold half 34. The locator pins 48 and mating sockets 50 may be tapered to facilitate registration. Although two such locator pins 48 and sockets 50 are depicted in the drawings, those of skill will appreciate that fewer or more such features may be implemented as the case may be. Furthermore, it is not necessary that these locating features be tapered or otherwise resemble those features depicted in the drawings, but rather may take various forms to accomplish the same purpose of helping to properly align the two mold halves 32, 34 and maintain their aligned condition during the injection molding process.

The press machine 22 includes a clamping mechanism, as generally indicated at 52 in FIGS. 1, 4, 6 and 7. The clamping mechanism 52 is directly responsive to the vertical motion of the press ram 26 for compressing the plurality of molds 30 in a direction normal, or perpendicular, to each of the parting lines 36. The clamping mechanism 52 may be designed in various ways, but in the drawings is depicted as a pair of movable wedges 54 directly connected to and movable with the press ram 26. A pair of co-acting stationary wedges 56 are directly connected to or otherwise integrated in the press bed 24. The movable 54 and stationary 56 wedges interact with one another in response to the reciprocating movement of the press ram 26, thereby causing compression upon the molds 30 in a force vector normal to their parting lines 36.

As illustrated, each of the injection molds 30 are horizontally arranged relative to one another within the press zone such that all of the parting lines 36 are disposed generally parallel to the movement of the press ram 26. Thus, the generally vertical motion of the press ram 26 is converted into a generally horizontal clamping force by the clamping mechanism 52, which acts to simultaneously compress all of the molds 30 together. In comparison to a prior art arrangement in which a vertically oriented press is equipped for rubber injection molding, the subject invention allows a greater number of mold cavities 38 to be filled simultaneously in the press machine 22. Furthermore, it is not necessary that every mold cavity 38 be identical to those in other molds 30. Therefore, different specification numbers may run simultaneously in the same batch.

Returning again to FIGS. 1 and 2, the press machine 22 is shown including first 58 and second 60 rails extending parallel to the direction of the clamping force on either side of the press zone. The rails 58, 60 may extend laterally from the press bed 24 to provide a loading and unloading zone so that batches of mold 30 can be moved through the press machine 22 more efficiently. The rails 58, 60 may support the molds 30 directly, or more preferably, support carriers 62 which in turn support the respective mold halves 32, 34. The carriers 62 are designed to directly connect to and slide along the first 58 and second 60 rails while supporting a single mold half 32 or 34 in a universal manner. In other words, without changing or moving the carrier 62, either mold half 32 or 34 can be placed in the carrier 62 in a forward or rearward facing orientation. Said another way, the offset gate 62 can be positioned either proximate the first rail 58 or proximate the second rail 60. This universal, reversible coupling is accomplished by forming the tapered lateral edges 42 of each mold half 32, 34 with a universal registration interface. In the illustrative embodiment depicted, that registration interface may take advantage of the tapered lateral edges 42 on the mold halves 32, 34. As shown, these lateral edges 42 may be formed with a bead for mating in a complementary groove 64 in each of the carriers 62. Of course, other registration interface designs may be substituted with equal effect for the bead and groove 64 configuration depicted in the drawings. Furthermore, it is contemplated in an alternate embodiment that a single carrier 62 may support one or more entire mold assemblies 30, i.e., a plurality of mold halves 32, 34.

The method for simultaneously molding a plurality of work parts 40 in separate molds 30 using a single press machine 22 according to the subject invention may be appreciated by reference in particular to FIGS. 6-10. These steps include providing a rubber injection press machine 22 having a movable press ram 26 and a stationary or otherwise opposing press bed 24. Those of the skill in the art will appreciate that the so-called "stationary" press bed 24 may in fact move relative to the foundation of the press machine 22. Nevertheless, for illustrative and convenience purposes, the press bed 24 is described as stationary. In effect, it is only necessary that there is provided relative movement between the press bed 24 and the press ram 26 to permit the molds 30 to be shuttled into and out of a position for injection molding to occur.

The method further includes reciprocating the press ram 26 in a generally vertical path toward and away from the press bed 24. A plurality of separate and distinct injection molds 30 each having two mold halves 32, 34 joining one another along a parting line interface 36, are provided. A mold cavity 38 is formed in the space between opposing mold halves 32, 34.

The method also includes the steps of positioning the molds 30 in the vertical path between the press bed 24 and press ram 26 in a horizontally extending arrangement so that each of the parting lines 36 are disposed generally parallel to the movement of the press ram 26. Molten rubber is supplied to the press ram 26 using a conventional injection molding apparatus (not shown) and distributed through runners 28 or other flow passages formed in the press ram 26.

The method also includes compressing the plurality of molds 30 together in response to the reciprocating motion of the press ram. The compressing step further includes converting the generally vertical motion of the press ram 26 into a generally horizontal clamping force and thereby simultaneously compressing all of the molds 30 together. Furthermore, the compressing step includes co-acting at least one movable wedge 54 connected to the press ram 26 with one stationary wedge 56 connected to the press bed 24. Again, it will be appreciated that the terms "movable" and "stationary" are used as words of illustration and not of limitation. Therefore, the stationary wedges 56 are considered stationary in relative terms in view of the movable wedges 54.

In one embodiment of the invention, the step of positioning the molds 30 in the vertical path of the press ram 26 includes the step of suspending the mold halves 32, 34 from at least one, but preferably two rails 58, 60 extending parallel to the direction of the compressing force. This step of positioning the molds in the pressing zone further includes supporting each mold half 32, 34 in a carrier 62. The carrier 62 is, itself, supported directly upon the spaced rails 58, 60.

FIGS. 9 and 10 depict, respectively, the steps of a mold cavity 38 being filled with molten rubber and then the resulting work part 40 being removed once it has sufficiently solidified. A method of the subject invention further includes the step of removing the molded work part 40 from the mold cavity 38 with the assistance of gravity. In other words, once the work part 40 is removed from the cavity 38, it is allowed to fall under the influence of the earth's gravitational pull into a collection receptacle, onto a conveyor or other handling device (not shown). A rotary brush 66 or other sweeping or scraping device may be used to assist removal of the work part 40 from the cavity 38. Accordingly, the method of this invention may further include the step of inserting a sweeper 66 between the opposing mold halves 32, 34.

The subject invention accomplishes numerous objections and overcomes all of the shortcomings found in prior art systems of this type. For example, this approach gains the de-molding advantages of a horizontal press while using a vertical press machine. The number of mold parting lines 36 can be increased, resulting in more molded parts 40 yield per heat. This invention allows lower tonnage machines to be used, which reduces the capital costs through the use of simple locking wedges 54, 56 for clamping instead of hydraulics. The subject design does not require any fasteners to accomplish mold changes. This fact alone reduces mold change times in that delays resulting from wrong tool and/or fasteners are avoided. In addition, this approach is more versatile than prior art approaches in that more than one job can be run simultaneously provided they share the same compound and cure time. The design facilitates automation in that very simple x-y robots can be used to perform mold changes.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A rubber injection molding apparatus for simultaneously molding a plurality of work parts in separate molds using a single press machine, said apparatus comprising:

a rubber injection press machine including a press bed and a vertically oriented press ram supported for reciprocating movement in a generally vertical path toward and away from said press bed;

a plurality of separate and distinct injection molds positioned between said press bed and said press ram, each of said molds having two mold halves joining one another along a parting line interface with a mold cavity defined between each of said mold halves;

a supply of molten rubber communicating with said press ram;

a clamping mechanism directly responsive to the vertical motion of said press ram for compressing said plurality of molds in a direction normal to each of said parting lines;

and each of said molds being horizontally arrayed relative to one another such that each of said parting lines are disposed generally parallel to the movement of the press ram, whereby the generally vertical motion of said press ram is converted into a generally horizontal clamping force by said clamping mechanism and thereby simultaneously compressing all of said molds together.

2. The apparatus of claim 1 wherein said clamping mechanism includes at least one moveable wedge directly connected to the press ram and one co-acting stationary wedge directly connected to said press bed, said moveable wedge and said stationary wedge interacting with one another in response to reciprocating movement of said press ram.

3. The apparatus of claim 2 wherein said press machine includes a first rail extending parallel to the direction of said clamping force, said mold halves being suspended from said first rail.

4. The apparatus of claim 3 wherein said press machine includes a second rail spaced parallel from said first rail and cooperatively suspending said mold halves therebetween.

5. The apparatus of claim 4 further including a plurality of carriers directly connected to said first and second rails, each said carrier supporting at least one of said mold halves.

6. The apparatus of claim 5 further including a taper registration interface between said mold half and said carrier.

7. The apparatus of claim 6 wherein each of said mold halves includes a lateral edge, said taper registration interface including a bead on said lateral edge for mating with a complementary groove in said carrier.

8. The apparatus of claim 7 further including a gate formed between mating said mold halves, said gate proximate said lateral edge.

9. The apparatus of claim 8 wherein said gate comprises an edge gate configuration style.

10. The apparatus of claim 1 further including at least one locator pin and a mating socket disposed between respective mating pairs of said mold halves.

11. A method for simultaneously molding a plurality of work parts in separate molds using a single press machine, said method comprising the steps of:
providing a rubber injection press machine having a moveable press ram and a stationary press bed;
reciprocating the press ram in a generally vertical path toward and away from the press bed;
providing a plurality of separate and distinct injection molds each having two mold halves joining one another along a parting line interface with a mold cavity between opposing mold halves;
positioning the molds in the vertical path between the press bed and the press ram in a horizontally extending array such that each of the parting lines are disposed generally parallel to the movement of the press ram;
supplying molten rubber to the press ram;
compressing the plurality of molds together in response to the reciprocating motion of the press ram;
and said compressing step further including converting the generally vertical motion of the press ram into a generally horizontal clamping force and thereby simultaneously compressing all of said molds together while filling the cavities with molten rubber.

12. The method of claim 11 wherein said compressing step further includes co-acting at least one moveable wedge connected to the press ram and one stationary wedge connected to the press bed.

13. The method of claim 11 wherein said step of positioning the molds in the vertical path includes the step of suspending the mold halves from at least one rail extending parallel to the direction of the compressing force.

14. The method of claim 11 wherein said step of positioning the molds in the vertical path includes the step of suspending the mold halves from a pair of spaced rails extending parallel to the direction of the compressing force.

15. The method of claim 14 further including the step of supporting each mold half in a carrier, the carrier being supported directly upon and slideable along the pair of spaced rails.

16. The method of claim 11 further including the step of removing a molded work part from the mold cavity with the assistance of gravity.

17. The method of claim 16 wherein said step of removing a molded part includes inserting a sweeper between the opposing mold halves.

* * * * *